2 Sheets—Sheet 1.

R. B. BLOWERS.
FRUIT-DRIER.

No. 191,303. Patented May 29, 1877.

Witnesses
Inventor
Russel B. Blowers
By Dewey & Co
Atty's

2 Sheets—Sheet 2.

R. B. BLOWERS.
FRUIT-DRIER.

No. 191,303. Patented May 29, 1877.

Witnesses Inventor
Russel B. Blowers
By
Atty.

UNITED STATES PATENT OFFICE.

RUSSEL B. BLOWERS, OF WOODLAND, CALIFORNIA.

IMPROVEMENT IN FRUIT-DRIERS.

Specification forming part of Letters Patent No. 191,303, dated May 29, 1877; application filed April 3, 1877.

*To all whom it may concern:*

Be it known that I, RUSSEL B. BLOWERS, of Woodland, county of Yolo, and State of California, have invented an Improved Fruit-Drier; and I do hereby declare the following to be a full, clear, and exact description thereof, reference being had to the accompanying drawings.

My invention relates to certain improvements in fruit-driers, and these improvements are more especially based upon a patent issued to me February 13, 1877, No. 187,349.

In that patent I described and claimed a heating-chamber surrounded by drying rooms, with doors and a draft-chimney, to produce a laterally and downwardly moving current of air, for the purpose of drying fruit and other substances.

My present invention consists in the employment of reversible air-currents and a mechanism by which this is accomplished, and also in a means for admitting large quantities of air and bringing them into contact with the heaters, so that it will be heated before passing into the chambers.

In order to dry economically by artificial means it is necessary that any apparatus built for the purpose should be able to dispose of large quantities of the material to be dried in a short time, and as the capacity of air for carrying away moisture is limited, it is necessary to pass it through the apparatus rapidly and in large volumes without the use of expensive blowers or other machinery for producing a draft. This I accomplish by means of my draft-chimney and passages, as described in my former patent, and I have found that with certain additions my apparatus may be made useful in drying lumber, fish, hops, chicory, and various other substances.

Figure 1:
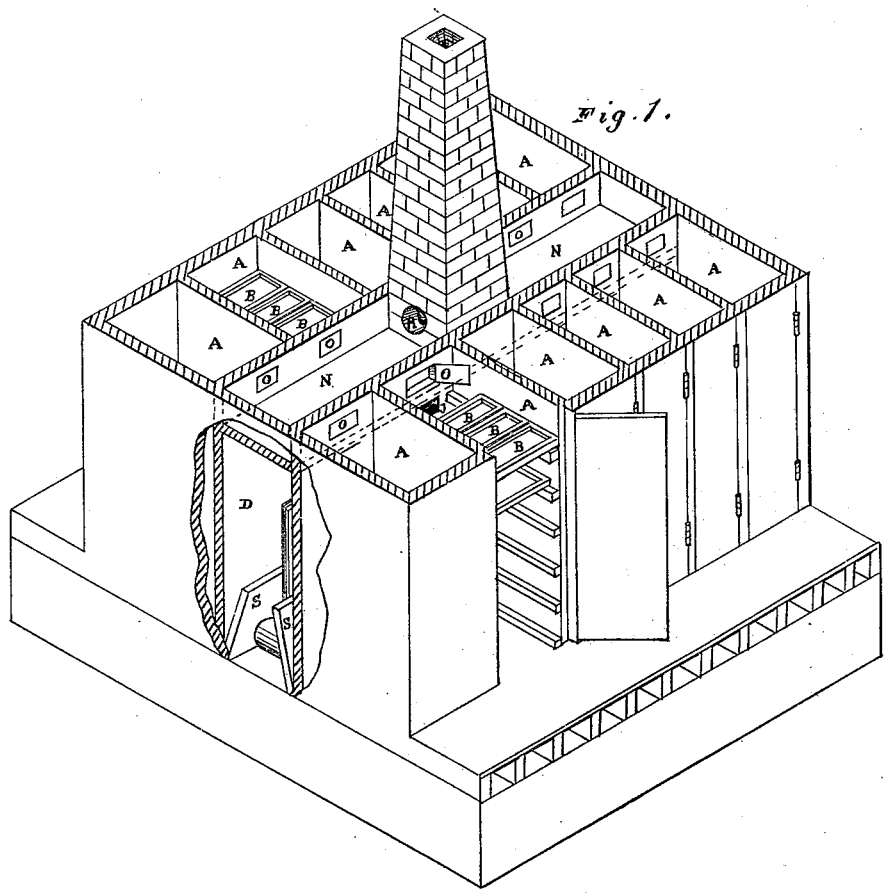
Figure 2:
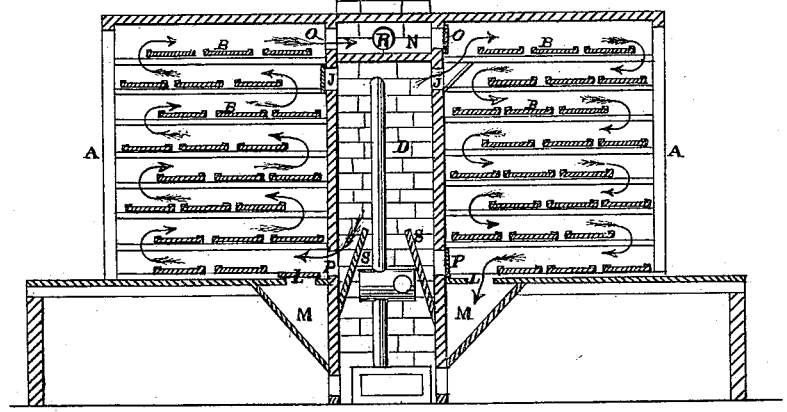
Figure 3:
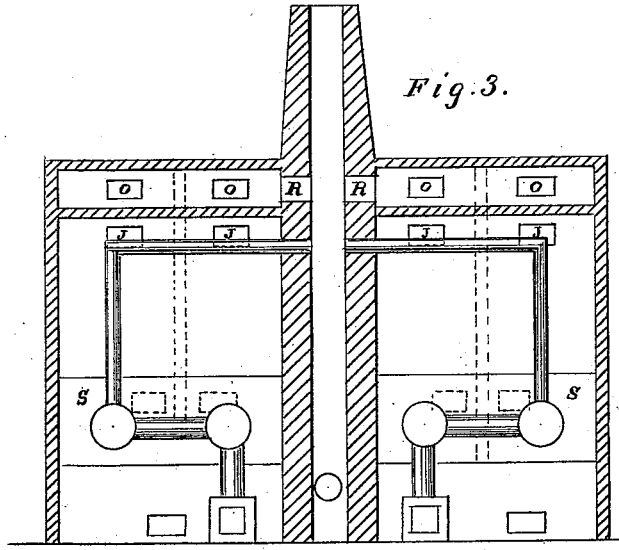

Referring to the accompanying drawings for a more complete explanation of my invention, Figure 1 is a perspective view with the top broken away. Fig. 2 is a transverse section taken across the heating and drying chambers. Fig. 3 is a section taken longitudinally through the heating-chamber.

A are the drying-chambers, provided with the trays B, or when lumber is to be dried it is so piled as to form lateral passages, closed at the bottom and top, the same as when the trays are used, and open at alternate ends, so that the air may pass alternately back and forward through these passages, and from one to another.

When the air passes downwardly, as in my former patent, it impinges upon the upper surface of the articles to be dried, which, in the case of fruit, is generally desirable; but in drying lumber and some other substances it is necessary to cause the air to impinge upon and pass along the under as well as the upper surfaces of the channels, and in order to effect this I have so constructed my apparatus as to produce currents of air moving alternately upward and downward through the lateral passages. This is done by forming a passage, N, just above or in the upper part of the heating-chamber D, and corresponding with the passages M below. Openings with doors O lead from the drying-rooms into this passage N at the top, and doors P at the bottom open directly into the heating-chamber D.

It will now be seen that when it is desired to allow the heated current to pass downward in the direction of the arrows shown on the right side of Fig. 2, the doors O, leading into the upper passage N, and the doors P, opening into the heating-chamber, are closed, and the doors J, leading from the upper part of the chamber D to the room A, will be opened, and also the doors L, leading from the lower part of the rooms A to the passages M. By the aid of the chimney so strong a draft is produced that it will renew the air in the rooms every four minutes. When the reverse current is desired the doors J and L are closed. The doors P, opening into the heating-chamber at the bottom, are opened, and the doors O, leading into the upper passage N, are also opened, so that the heat will enter the lower part of the rooms A and escape at the upper part, as indicated by the arrows upon the left side of Fig. 2. Openings R lead from the passage N to the chimney, so that when the passages M are closed a strong draft will be established from the heating-chamber through doors P and alternate lateral passages, the doors O, passages N, and chimney thus entirely reversing the current. This upwardly-moving current, as it moves from one passage to another in the drying-chambers, impinges upon the upper surfaces of each passage or bottom of the trays, and although its drying power is to a certain extent exerted upon all parts, yet its best results are shown in this upper part. The downwardly-moving current, on the contrary, impinges upon the bottom of the passages or contents of the trays, and thus these two currents are of different values in different cases.

In order to heat all the air which enters the chamber D and prevent the entrance of cold air to the drying-rooms, especially when the air is allowed to enter at the bottom, I employ deflectors S, which are partitions inclining toward each other, as shown, and the air, being admitted to the chamber below these deflectors, is caused by them to pass upward and be exposed to the heat of the furnaces and drums, after which it will be drawn downward behind the deflectors, so as to enter the doors P in a heated condition.

The great point of advantage in my method of passing the air alternately from end to end of close passages formed by the arrangement of the contents of the drying-chambers is, that the air passes over instead of through the substance to be dried, and by this I secure the advantage of an uninterrupted flue from one end to the other of the machine, and a strong and rapidly-renewed current is kept up all the time, instead of a dead sluggish body of moist air, which is retarded by its passage through the substance to be dried.

In drying fruit I can employ a close-bottomed tray, which is much cheaper than a perforated one.

By the use of one chimney, into which the products of combustion pass, and with which all the drying-chambers are connected, I form a positive and compulsory draft through all my drying-flues.

Having thus described my invention, what I claim as new, and desire to secure by Letters Patent, is—

1. The heating-chamber D, with its air-passages M N, and the drying-rooms A, with their tiers of trays or other materials, in combination with the doors P and O, the passage N, and the uptake or chimney E, substantially as and for the purpose herein described.

2. The heating-chamber D and the drying-rooms A, having the upper and lower passages N and M, with their respective connecting-doors O P and J L, in combination with the draft-chimney E, whereby a current of heated air may be caused to pass through the drying-rooms in either direction at will, without the aid of any other apparatus for producing a draft, substantially as herein described.

In witness whereof I have hereunto set my hand and seal.

R. B. BLOWERS. [L. S.]

Witnesses:
GEO. H. STRONG,
OLWYN T. STACY.